Figure 1:
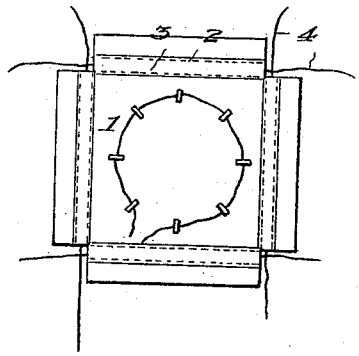

No. 614,921.  
C. ZIMMERMAN.  
TREE PROTECTOR.  
(Application filed Nov. 29, 1897.)  
Patented Nov. 29, 1898.

(No Model.)

Witnesses  
Inventor  
Casper Zimmerman.  
by  
H. B. Willson & Co.  
Attorney

UNITED STATES PATENT OFFICE.

CASPER ZIMMERMAN, OF SANTA ROSA, CALIFORNIA.

TREE-PROTECTOR.

SPECIFICATION forming part of Letters Patent No. 614,921, dated November 29, 1898.

Application filed November 29, 1897. Serial No. 660,123. (No model.)

*To all whom it may concern:*

Be it known that I, CASPER ZIMMERMAN, a citizen of the United States, residing at Santa Rosa, in the county of Sonoma and State of California, have invented certain new and useful Improvements in Tree-Protectors; and I do declare the following to be a full, clear, and exact description of the invention, such as will enable others skilled in the art to which it appertains to make and use the same.

My invention relates to a novel form of tree-protector; and the object is to provide a simple and inexpensive protector for fruit and other trees to prevent damage from frost and sudden falls of temperature and at the same time furnish an efficient hood or canopy while the tree is being treated by fuming, smoking, or otherwise to destroy insects and other vermin.

To these ends the invention consists in the construction, combination, and arrangement of the device, as will be hereinafter more fully described, and particularly pointed out in the claim.

The accompanying drawings show my invention in the best form now known to me.

In the several figures in the drawings the same reference characters indicate the same parts of the invention.

Figure 2:
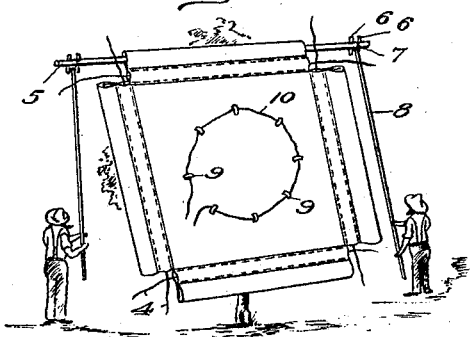
Figure 3:
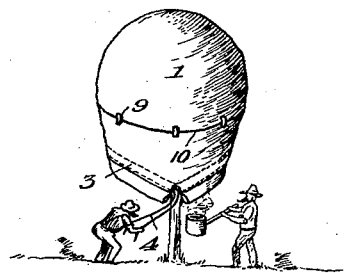
Figure 4:
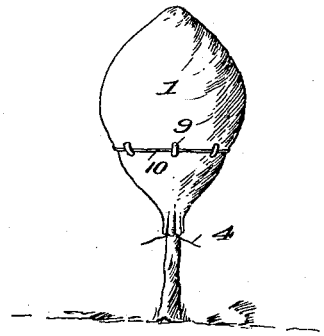

Figure 1 is a plan view of my improved tree-protector. Fig. 2 is a perspective view showing the manner of applying the protector to a tree. Fig. 3 is a similar view showing the protector applied, with the lower portion opened to permit fuming or otherwise treating the tree against the ravages of insects. Fig. 4 is a similar view of the protector in place on the tree.

1 represents a sheet of any suitable fabric, having its four edges formed with a hem or felling 2 and between the body of the fabric and the hem a pocket or casing 3 to receive the puckering-string 4.

5 represents a light wooden bar which is inserted through the hem, and its outer ends are provided with removable pegs 6 6, between which is inserted the string 7 of the poles 8. A series of loops or straps 9 9 are secured to the body of the fabric and a light rope or cord passed through them.

As shown in Fig. 2, the fabric is elevated by means of the poles 8 8 and placed over the tree or plant, so that its four edges are about equidistant from the ground. The bar 5 is now removed and the cords 4 4 drawn together, so that the fabric will form a hood or envelop for the tree, leaving a sufficient opening at the bottom, as shown in Fig. 3, to permit the tree to be smoked, fumed, or otherwise treated. In the case of frost or to anticipate sudden falls of temperature the puckering-strings 4 4 may be drawn tightly around the base of the tree and likewise the rope or cord 10 around its body to completely envelop it and protect it against the weather.

The device is very simple, cheap, and effective for the purpose intended. It may be readily applied and after the danger is past is easily removed and stored away for future use.

Having thus described my invention, what I claim as new and useful, and desire to secure by Letters Patent of the United States, is—

The combination with the rectangular fabric 1 provided at its four edges with hems or pockets, of the rod 5 adapted to be removably contained in one of said hems or pockets and provided near its ends with the removable pegs 6, 6, and the poles 8, 8, provided with the strap 7 adapted to secure said poles between the pegs 6, 6, substantially as specified.

In testimony whereof I hereunto affix my signature in presence of two witnesses.

CASPER ZIMMERMAN.

Witnesses:
JOHN T. CAMPBELL,
J. H. NEYCE.